US008219930B2

(12) United States Patent
Johns

(10) Patent No.: US 8,219,930 B2
(45) Date of Patent: Jul. 10, 2012

(54) RADIAL MENU DISPLAY SYSTEMS AND METHODS

(75) Inventor: Greg A Johns, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 12/492,277

(22) Filed: Jun. 26, 2009

(65) Prior Publication Data

US 2010/0333030 A1  Dec. 30, 2010

(51) Int. Cl.
*G06F 3/048* (2006.01)
(52) U.S. Cl. ........ 715/834; 715/810; 715/815; 715/848; 715/853
(58) Field of Classification Search .................. 715/834
See application file for complete search history.

(56) References Cited

U.S. PATENT DOCUMENTS

| | | | | |
|---|---|---|---|---|
| 5,602,564 A | * | 2/1997 | Iwamura et al. | 715/782 |
| 6,097,393 A | * | 8/2000 | Prouty et al. | 345/419 |
| 6,359,635 B1 | * | 3/2002 | Perttunen | 715/834 |
| 6,549,219 B2 | * | 4/2003 | Selker | 715/834 |
| 7,817,168 B2 | * | 10/2010 | Nagiyama et al. | 345/661 |
| 2006/0212833 A1 | * | 9/2006 | Gallagher et al. | 715/848 |
| 2010/0241999 A1 | * | 9/2010 | Russ et al. | 715/863 |

* cited by examiner

*Primary Examiner* — Alvin Tan

(57) ABSTRACT

In certain embodiments, a graphical representation of a two-dimensional radial menu is displayed in a graphical user interface. The graphical representation of the two-dimensional radial menu is transformed into a graphical representation of a three-dimensional radial menu in the graphical user interface. In certain embodiments, the displaying comprises utilizing data representative of a three-dimensional radial menu model to render the graphical representation of the two-dimensional radial menu, based on a first viewpoint, in the graphical user interface, and the transforming comprises utilizing the data representative of the three-dimensional radial menu model to render the graphical representation of the three-dimensional radial menu, based on a second viewpoint, in the graphical user interface. In certain embodiments, the transforming comprises repositioning a viewpoint associated with the graphical representation of the two-dimensional radial menu to produce the graphical representation of the three-dimensional radial menu.

23 Claims, 10 Drawing Sheets

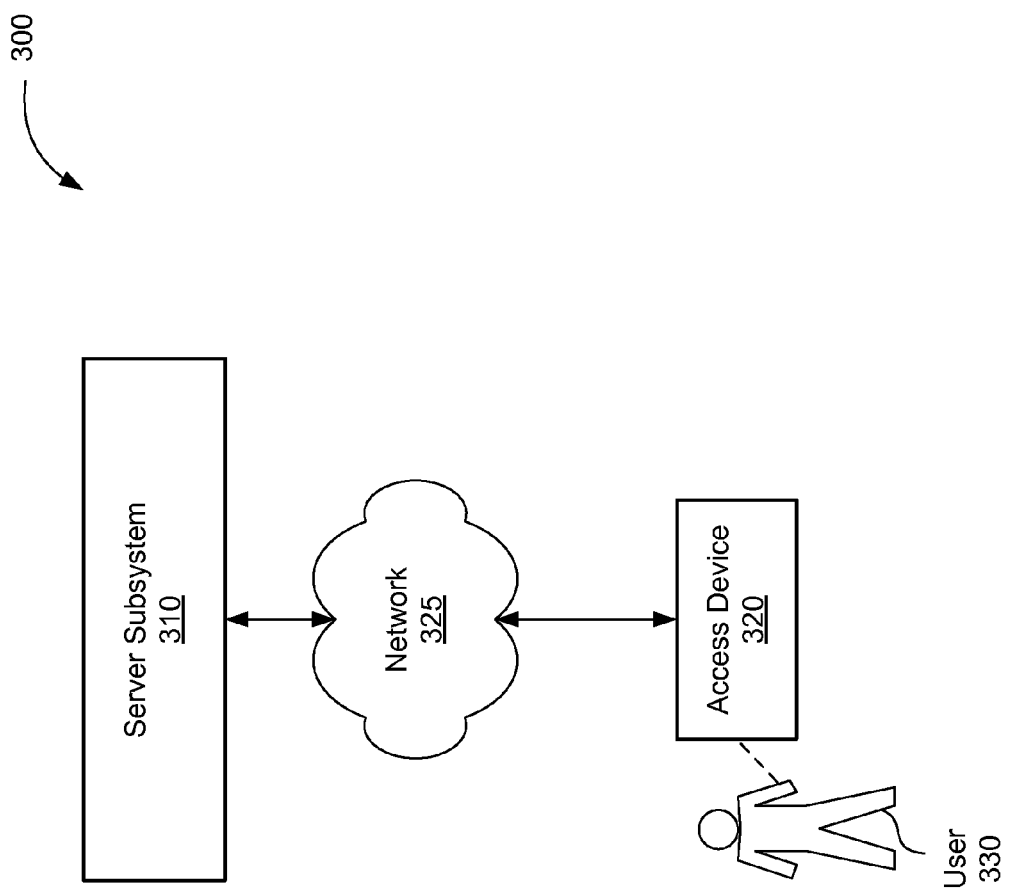

RADIAL MENU DISPLAY SYSTEMS AND METHODS

BACKGROUND INFORMATION

Advances in electronic technologies and devices have put a wide variety of applications, features, and information at people's fingertips. The proliferation of such applications, features, and information on electronic devices has challenged designers of user interfaces for the electronic devices. For example, a common challenge has been to design and implement user interface elements that provide an intuitive and appropriate balance of information, usability, aesthetics, and functionality. The difficulty of the challenge is exacerbated for electronic devices that have limited resources and/or that are small in size, such as a phone device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates another exemplary implementation of the system of FIG. 1.

DETAILED DESCRIPTION OF PREFERRED EMBODIMENTS

Exemplary radial menu display systems and methods are described herein. In certain embodiments, a graphical representation of a two-dimensional radial menu may be displayed in a graphical user interface ("GUI"). The graphical representation of the two-dimensional radial menu may be transformed into a graphical representation of a three-dimensional radial menu in the GUI. In certain embodiments, a user selection of a center point graphical object included in the graphical representation of the two-dimensional radial menu may be detected and the transformation of the graphical representation of the two-dimensional radial menu into the graphical representation of a three-dimensional radial menu in the GUI may be executed in response to the user selection.

In certain embodiments, the graphical representation of the two-dimensional radial menu and the graphical representation of the three-dimensional radial menu may include a common center point that is repositioned in the graphical user interface upon transforming the graphical representation of the two-dimensional radial menu into a graphical representation of a three-dimensional radial menu in the GUI. In certain embodiments, the graphical representation of the two-dimensional radial menu may include at least one category menu graphical object that is repositioned in the graphical user interface upon transforming the graphical representation of the two-dimensional radial menu into a graphical representation of a three-dimensional radial menu in the GUI.

In certain embodiments, data representative of a radial menu model may be maintained and utilized to render at least one of the two-dimensional radial menu model and the three-dimensional radial menu model in the GUI. The radial menu model may include a center point, a plurality of category menu objects positioned about the center point at a first radial distance from the center point, and a plurality of application menu objects positioned about the plurality of category menu objects at a second radial distance from the center point.

The exemplary graphical representations of radial menus disclosed herein may provide a convenient, intuitive, consistent, and centric experience for a user who utilizes one or more of the radial menus to navigate and select one or more features accessible to and/or provided by a computing device. Exemplary embodiments of radial menu display systems and methods will now be described in more detail with reference to the accompanying drawings.

Figure 1:
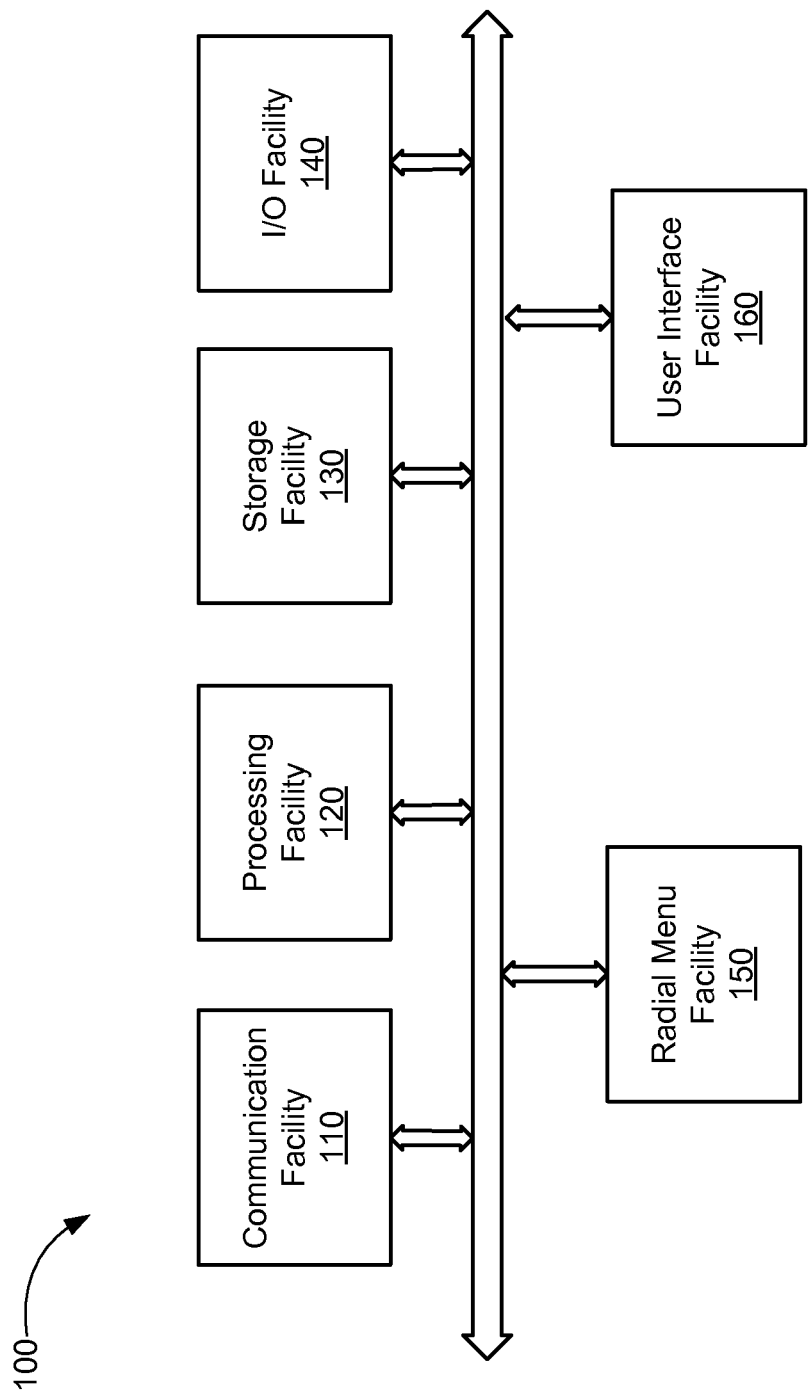
FIG. 1 illustrates an exemplary radial menu display system.

FIG. 1 illustrates an exemplary computing system 100 ("system 100") configured to provide one or more graphical representations of radial menus. System 100 may include a communication facility 110, processing facility 120, storage facility 130, input/output ("I/O") facility 140, radial menu facility 150, and user interface facility 160 communicatively coupled to one another as shown in FIG. 1. The components of system 100 may communicate with one another, including sending data to and receiving data from one another, using any suitable communication technologies.

In some examples, system 100, or one or more components of system 100, may include any computing hardware and/or instructions (e.g., software programs), or combinations of computing instructions and hardware, configured to perform one or more of the processes described herein. In particular, it should be understood that system 100, or one or more components of system 100, may be implemented on one physical computing device or may be implemented on more than one physical computing device. Accordingly, system 100 may include any one of a number of computing devices employing any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, from a computer-readable medium (e.g., from a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computing device can read.

Accordingly, each of the components of system 100 may be implemented as hardware, computing instructions (e.g., software) tangibly embodied on a computer-readable medium, or a combination of hardware and tangibly embodied computing instructions configured to perform one or more of the processes described herein. In certain embodiments, for example, radial menu facility 150 may be implemented as one or more software applications embodied on one or more computer-readable media and configured to direct processing facility 120, user interface facility 160, and/or one or more other components of system 100 to execute one or more of the processes described herein.

Figure 2:
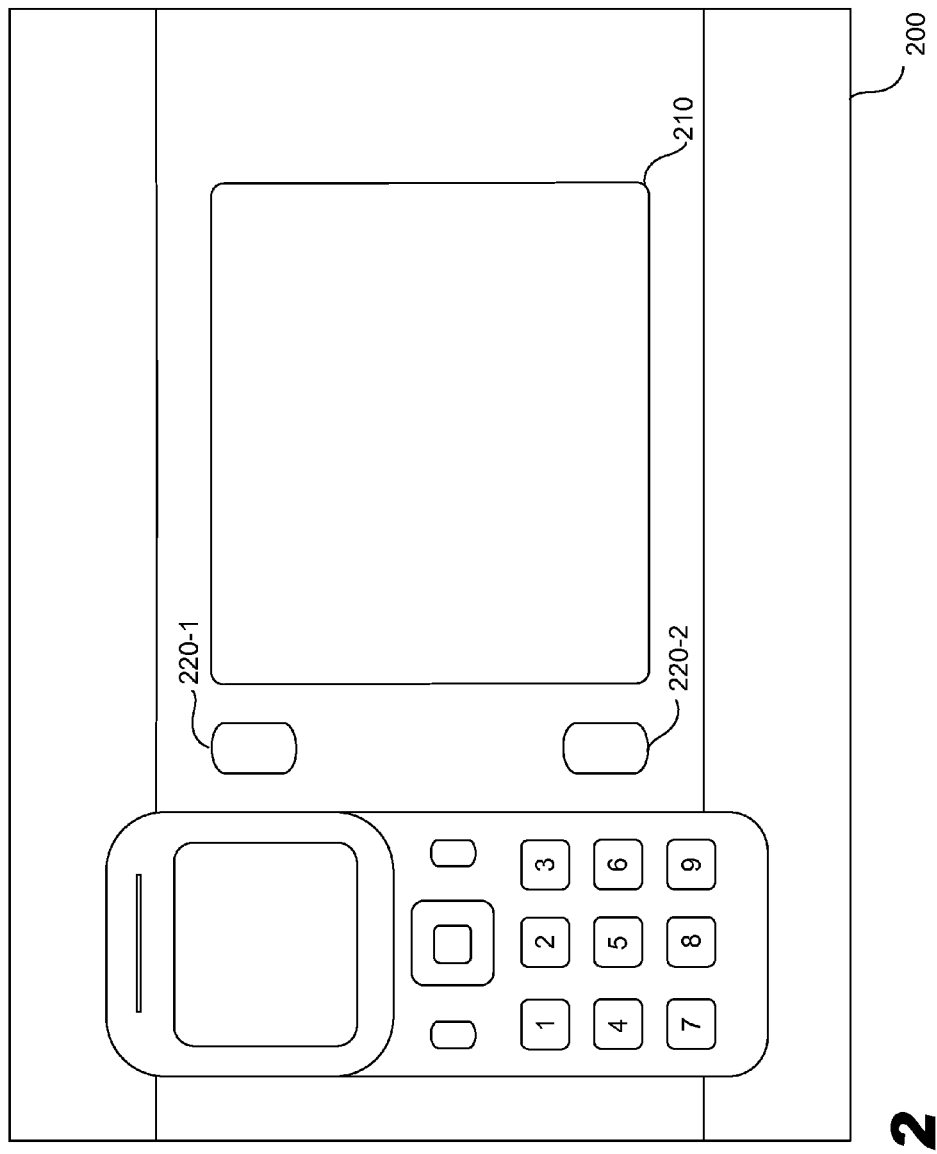
FIG. 2 illustrates an exemplary device having the system of FIG. 1 implemented therein.

In certain embodiments, system 100 may be implemented on one or more devices, as may suit a particular application. For example, FIG. 2 illustrates an exemplary phone device 200 (e.g., a home or business phone console such as a Verizon Hub phone device) having system 100 implemented thereon. Device 200 may include one or more of the components of system 100 shown in FIG. 1 and may be configured to perform one or more of the processes and/or operations described herein. While FIG. 2 illustrates an exemplary phone console device 200, system 100 may be implemented on other devices in other embodiments. Such devices may include, but are not limited to, a communications device, user device, mobile device (e.g., a mobile phone device), handheld device, computer, personal-digital assistant device, set-top box and connected display device (e.g., a television), display device, console device, and any other device configured to perform one or more of the processes and/or operations described herein.

As shown in FIG. 2, device 200 may include a display 210, which may be part of I/O facility 140 and may include one or more display components and technologies configured to display one or more GUIs for viewing by a user of device 200. For example, display 210 may include a display screen configured to display one or more GUIs for viewing by a user of device 200. In certain implementations, the display screen may comprise a touch screen display configured to receive touch input. The touch screen display may employ any suitable single-touch and/or multi-touch touch screen technologies. Examples of GUIs and various GUI views that may be displayed on a display such as display 210 are described in detail further below. In addition to display 210, device 200 may include input mechanisms such as one or more of the input buttons 220 (e.g., input buttons 220-1 and 220-2) shown in FIG. 2. Input buttons 220 may be part of I/O facility 140.

The implementation of system 100 shown in FIG. 2 is illustrative only. Other embodiments may include alternative implementations. As an example, FIG. 3 illustrates another exemplary implementation 300 of system 100. In implementation 300, components of system 100 may be distributed across a server subsystem 310 and an access device 320 configured to communicate with server subsystem 310 by way of a network 325. Distribution of components of system 100 across server subsystem 310 and access device 320 may be arranged as may suit a particular application. In certain examples, I/O facility 140 and user interface facility 160 may be implemented in access device 320, and one or more of the other facilities may be implemented in server subsystem 310. In other examples, I/O facility 140, radial menu facility 150, and user interface facility 160 may be implemented in access device 320, and one or more of the other facilities may be implemented in server subsystem 310. In yet other examples, any component of system 100 may be divided and distributed across server subsystem 310 and access device 320. For instance, radial menu facility 150 and/or user interface facility 160 may be divided and distributed across server subsystem 310 and access device 320 in certain embodiments.

Server subsystem 310 may include at least one server with one or more of the components of system 100 implemented thereon, and access device 320 may include any suitable device with one or more components of system 100 implemented thereon. In certain embodiments, for example, access device 320 may include I/O facility 140, or user interface facility 160 and I/O facility 140, such that access device 320 is configured to generate and/or display one or more of the GUIs described herein for viewing by a user 330 of access device. Access device 320 may include, but is not limited to, a communications device, mobile device (e.g., a mobile phone device), handheld device, computing device (e.g., a desktop or laptop computer), phone device (e.g., Verizon Hub device), personal-digital assistant device, set-top box and connected display device, gaming device, wireless communications device, and/or any other device having one or more components of system 100 implemented thereon and configured to perform one or more of the processes described herein.

Network 325 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol ("VoIP") networks, Public Switched Telephone Networks ("PSTN"), data communications networks, other communications networks, and any other networks capable of carrying communications and/or data between access device 320 and server subsystem 310. Communications between server subsystem 310 and access device 320 may be transported using any one of above-listed networks, or any combination or sub-combination of the above-listed networks.

Access device 320 and server subsystem 310 may communicate over network 325 using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Returning to FIG. 1, each of the components shown therein will now be described in additional detail.

Communication facility 110 may be configured to send, receive, and/or otherwise process data representative of or otherwise associated with communication events. As used herein, a "communication event" may include any communication between two or more communication devices and/or between two or more persons or entities ("contacts") by way of the devices. Examples of such communication events may include, but are not limited to, voice communications (e.g., Voice Over IP ("VoIP"), Public Switched Telephone Network ("PSTN"), or other active, attempted, completed, or recorded voice calls and/or messages), text messages (e.g., Short Message Service ("SMS") messages), media messages (e.g., Multimedia Message Service ("MMS") messages), e-mail messages, chat messages (e.g., Instant Messaging ("IM") messages), and subscriber feed messages (e.g., RSS feed messages).

Communication facility 110 may employ any suitable technologies for processing communication events, including sending and/or receiving signals representative of or otherwise associated with communication events over one or more communication networks. As an example, communication facility 110 implemented on device 200 may be configured to send and/or receive signals representative of or otherwise associated with communication events to/from another device over one or more communication networks.

Communication facility 110 may be configured to maintain data representative of communication events. Such data, which may be referred to as "communications data," may be stored by communication facility 110 and/or on one or more suitable computer-readable media, such as storage facility 130. Communications data may include any information descriptive of or otherwise associated with one or more communication events. For example, communications data may include contact information descriptive of contacts associated with communication events (e.g., sender and receiver contact information). Such contact information may include contact identifiers (e.g., contact names), phone numbers, e-mail addresses, and/or other information descriptive of parties to and/or devices associated with communication events. As another example, communications data may include time information associated with communication events, including communication time stamps (e.g., start and end times), communication duration information, and any other information descriptive of time information (e.g., time component) associated with communication events. Communications data may also include device identifiers, routing information, media attachments, communication content, address information, communication status information, communication type indicators, and/or other attributes or information descriptive of or otherwise associated with communication events.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, storage facility 130 may include, but is not limited to, a hard drive, network drive, flash drive, magnetic disc, optical disc, RAM, DRAM, other non-volatile and/or volatile storage unit, or a combination or sub-combination thereof. Electronic data, including data described herein, may be temporarily and/or permanently stored in storage facility 130.

I/O facility 140 may be configured to receive user input and provide user output and may include any hardware, firmware, software, or combination thereof supportive of input and output capabilities. For example, I/O facility 140 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 140 may include one or more devices for presenting output to a user, including, but not limited to, a graphics engine, a display (e.g., display 210), one or more display drivers, one or more audio speakers, and one or more audio drivers. Output may include audio, visual, textual, and/or haptic output. In certain embodiments, for example, I/O facility 140 is configured to display one or more GUIs for viewing by a user. Exemplary GUIs and GUI views that may be displayed by I/O facility 140 are described further below.

User interface facility 160 may be configured to generate, or direct processing facility 120 to generate, one or more user interfaces. For example, user interface facility 160 may be configured to generate and provide data representing one or more GUIs to I/O facility 140 for display. In certain embodiments, user interface facility 160 may receive data from radial menu facility 150 and utilize the received data to generate a GUI view for display in a GUI. User interface facility 160 may provide data representative of the GUI to I/O facility 140 for display. As mentioned, exemplary GUIs and GUI views are described further below.

Radial menu facility 150 may be configured to generate, provide, render and/or utilize data representative of a radial menu for display in a GUI. For example, radial menu facility 150 may provide data representative of a radial menu to user interface facility 160 for inclusion in a GUI. The data representative of a radial menu may be used by user interface facility 160 to display a graphical representation of a radial menu in a GUI. The graphical representation of the radial menu may include a graphical representation of a two-dimensional radial menu and/or a three-dimensional radial menu. Exemplary graphical representations of a two-dimensional radial menu and a three-dimensional radial menu are described further below.

In certain embodiments, radial menu facility 150 may be configured to provide data representative of a transformation from a graphical representation of one radial menu to a graphical representation of another radial menu in a GUI. For example, radial menu facility 150 may provide data representative of a transformation from a graphical representation of a two-dimensional radial menu to a graphical representation of a three-dimensional radial menu in a GUI. Alternatively or additionally, radial menu facility 150 may provide data representative of a transformation from a graphical representation of a three-dimensional radial menu to a graphical representation of a two-dimensional radial menu in a GUI. Exemplary transformations between graphical representations of radial menus are described further below.

In certain embodiments, radial menu facility 150 may be configured to maintain data representative of a radial menu model in a computer-readable medium such as storage facility 130. Radial menu facility 150 may utilize the data representative of the radial menu model to render, or direct one or more components (e.g., processing facility 120) of system 100 to render, a graphical representation of the radial menu model in a GUI. An exemplary radial menu model is described further below.

Figure 4A:
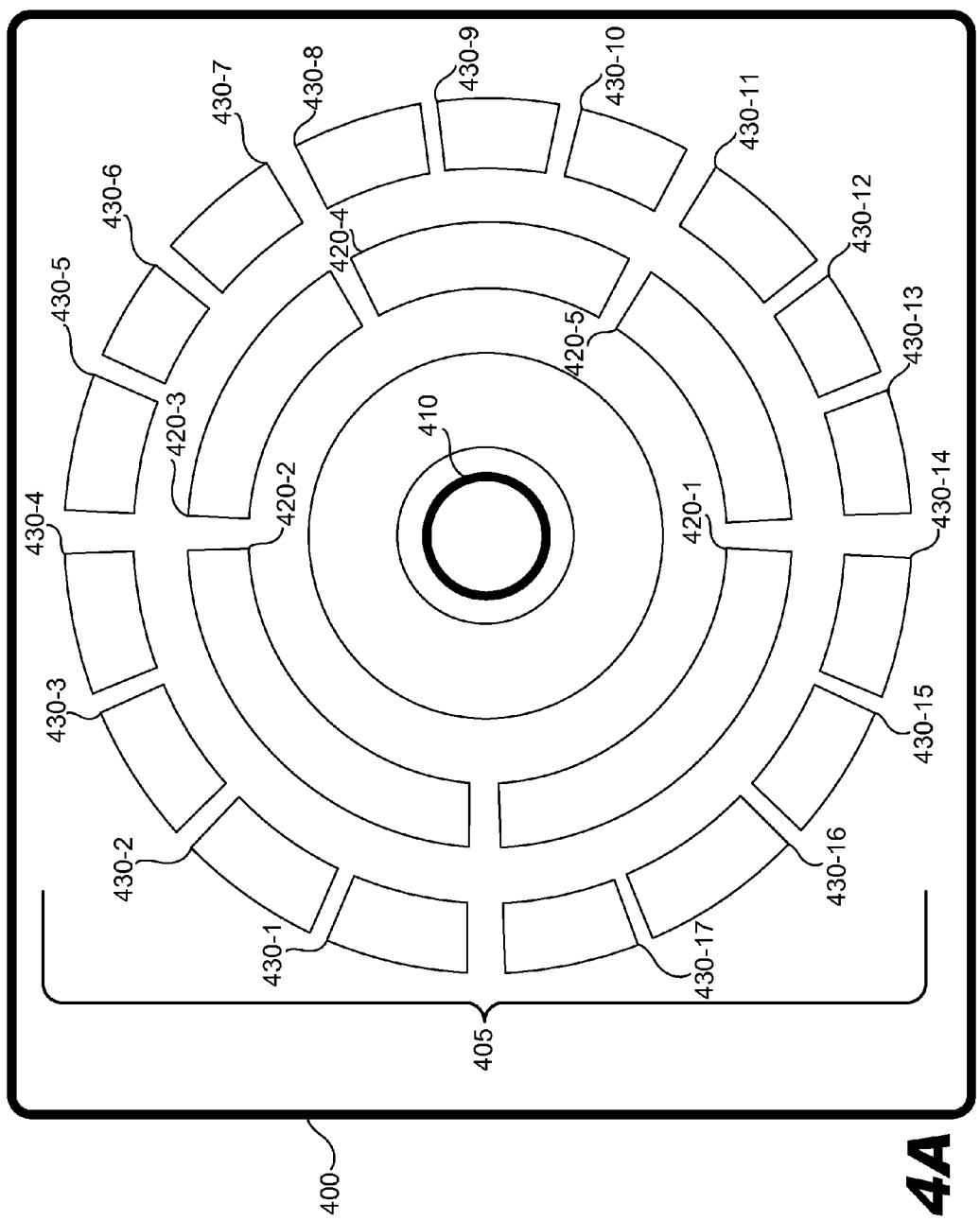
FIGS. 4A-4B illustrate a graphical representation of an exemplary two-dimensional radial menu in a graphical user interface ("GUI").
Figure 4B:
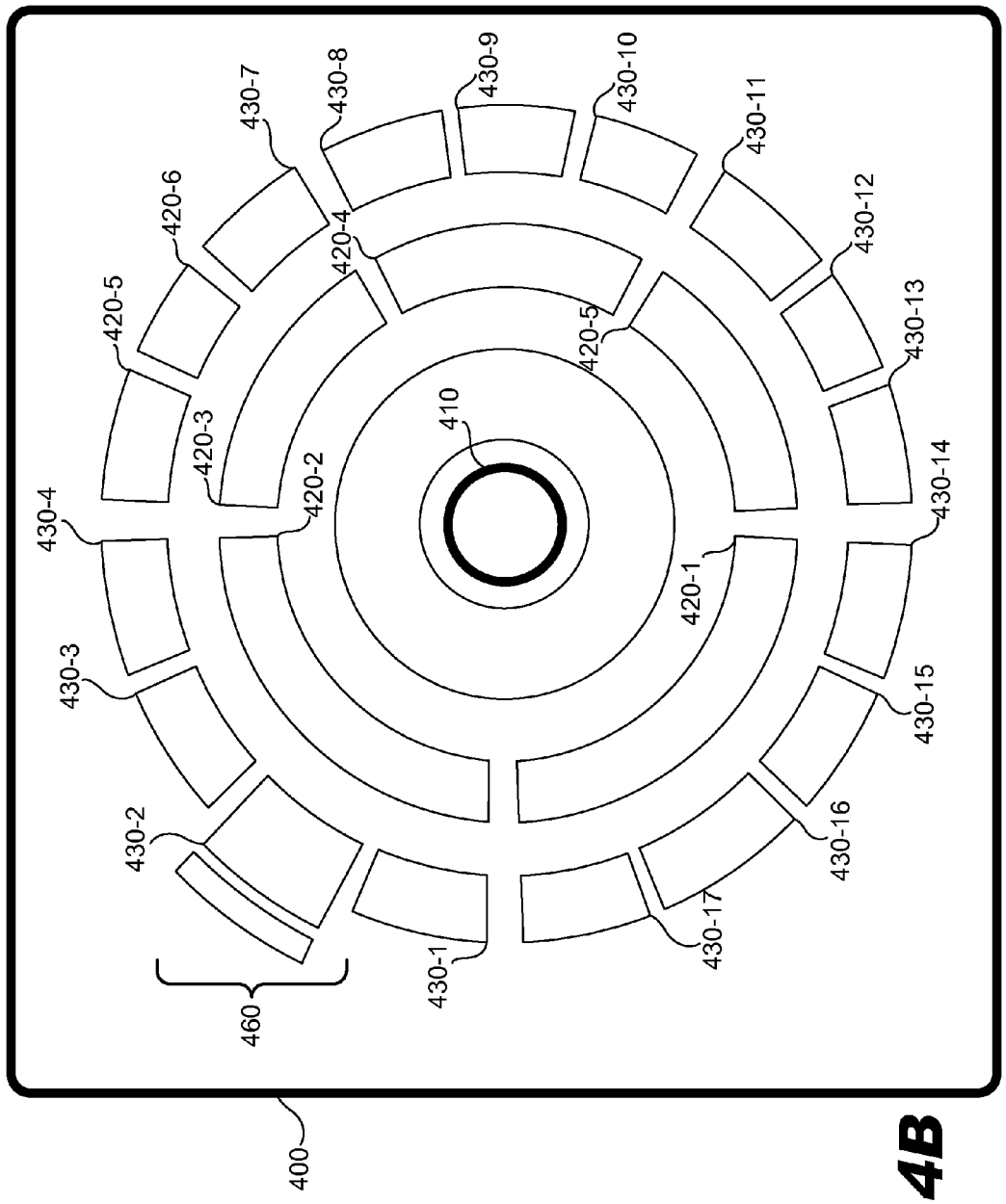
Figure 5:
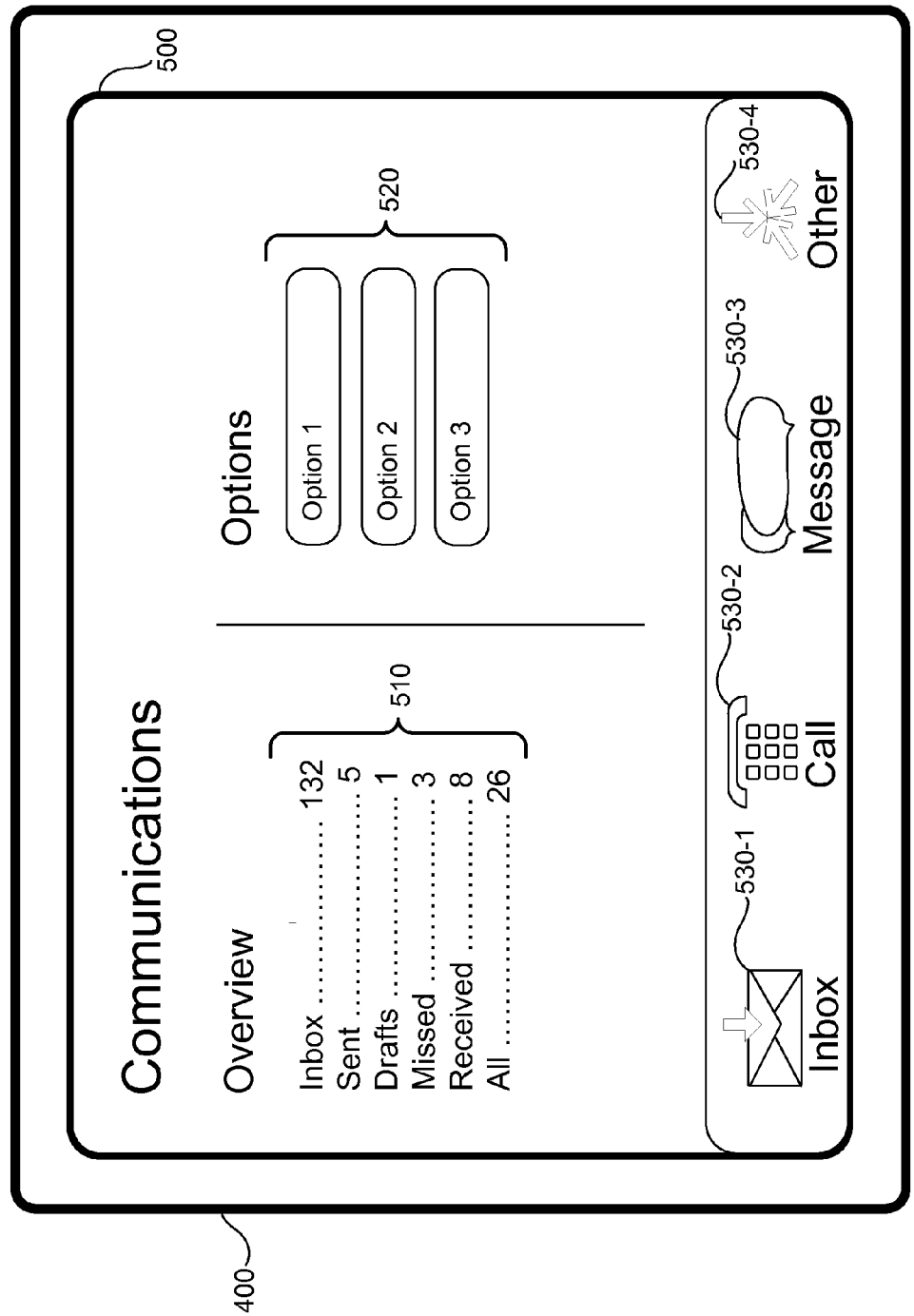
FIG. 5 illustrates a graphical representation of an exemplary category menu view in a GUI.

To help facilitate an understanding of radial menu facility 150 and radial menus, FIGS. 4A, 4B, and 5 illustrate exemplary graphical representations of radial menus that may be displayed in a GUI. FIG. 4A illustrates a GUI 400 including an exemplary graphical representation of a two-dimensional radial menu 405 displayed therein. Graphical representation of two-dimensional radial menu 405 may include a plurality of graphical objects arranged in a two-dimensional radial configuration within GUI 400. In the illustrated example, graphical objects are arranged about a center point in a generally circular configuration. This is illustrative only. Other radial configurations (e.g., an arc or a spiral) may be used in other embodiments.

As illustrated in FIG. 4A, graphical representation of two-dimensional radial menu 405 may include a center point graphical object 410, a plurality of category menu graphical objects 420 (e.g., category menu graphical objects 420-1 through 420-5), and a plurality of application menu graphical objects 430 (e.g., application menu graphical objects 430-1 through 430-17). Center point graphical object 410 may indicate generally a radial center point of graphical representation of two-dimensional radial menu 405. Center point graphical object 410 may comprise any suitable visual indicator and/or attribute configured to visually represent the radial center point of the graphical representation of two-dimensional radial menu 405 and/or to distinguish center point graphical object 410 from one or more other graphical objects displayed in GUI 400.

Category menu graphical objects 420 may represent categories of applications (e.g., software and/or device applications). Each category may include a menu category associated with one or more applications that share at least one common attribute. Categories may be defined and organized in any suitable way and may be associated with groups of one or more applications based on any attribute(s) common to one or more applications. Examples of such categories may include, but are not limited to, a communications category, an accessories category, a settings category, a games category, an entertainment category, a media category, a software programs category, a "go to" category, and any other menu category with which an application may be associated. As an example, one of the category menu graphical objects 420 in GUI 400 may represent a communications category associated with one or more communications applications, such as voice communication applications, email applications, and/or text messaging applications.

Category menu graphical objects 420 may comprise any suitable visual indicator and/or attribute configured to visually represent one or more categories of applications and/or to distinguish category menu graphical objects 420 from one another and/or from one or more other graphical objects displayed in GUI 400. In certain embodiments, for example, category menu graphical objects 420 may include text specifying menu categories represented by the category menu graphical objects 420. For instance, one of the category menu graphical objects 420 may represent a communications menu category and may include text (e.g., "communications") indicative of the communications menu category.

Application menu graphical objects 430 may represent one or more applications, which may include any software and/or device applications provided by (e.g., executable by) computing system 100 and/or accessible to a user of computing system 100. Examples of such applications may include, but are not limited to, voice communication applications (e.g., phone call applications), email applications, text messaging applications, instant messaging applications, printing applications, security applications, word processing applications, spreadsheet applications, media player applications, device programming applications, web browser applications, gaming applications, widget applications, and/or any other applications that are executable on computing system 100.

Application menu graphical objects 430 may comprise any suitable visual indicator and/or attribute configured to visually represent one or more applications and/or to distinguish application menu graphical objects 430 from one another and/or from one or more other graphical objects displayed in GUI 400. In certain embodiments, for example, application menu graphical objects 430 may include text and/or icons specifying applications represented by the application menu graphical objects 430. For instance, application menu graphical object 430-2 may represent an application and may include text and/or an icon indicative of the application.

Graphical representation of two-dimensional radial menu 405 may visually represent a hierarchical menu organization of applications and menu categories associated with computing system 100. In particular, graphical representation of two-dimensional radial menu 405 may visually represent relationships between applications and menu categories in GUI 400. For instance, application menu graphical objects 430 may be positioned relative to certain category menu graphical objects 420 to visually indicate one or more hierarchical relationships. As an example, a position of category menu graphical object 420-2 relative to positions of application menu graphical objects 430-1 through 430-4 may represent that the applications represented by application menu graphical objects 430-1 through 430-4 are hierarchically related to a menu category represented by menu graphical object 420-2. In the illustrated example, the relationships between the applications represented by application menu graphical objects 430-1 through 430-4 and the menu category represented by category menu graphical object 420-2 may be visually depicted by alignment of each of the application menu graphical objects 430-1 through 430-4 with the category menu graphical object 420-2 moving in a particular direction away from center point graphical object 410.

As illustrated in FIG. 4A, category menu graphical objects 420 may be radially aligned to form an inner radial layer of category menu graphical objects 420 positioned about center point graphical object 410 at a first radial distance from center point graphical object 410. In certain embodiments, the inner radial layer of category menu graphical objects 420 may substantially encircle center point graphical object 410. As shown in the illustrated example, the inner radial layer of category menu graphical objects 420 may contain certain divisions, of any size or proportion, separating the individual category menu graphical objects 420.

In addition, application menu graphical objects 430 may be radially aligned to form an outer radial layer of application menu graphical objects 430 positioned about center point graphical object 410 at a second radial distance from center point graphical object 410. In certain embodiments, the outer radial layer of application menu graphical objects 430 may substantially encircle the inner radial layer of category menu graphical objects 420. As shown in the illustrated example, the outer layer of application menu graphical objects 430 may contain certain divisions, of any size or proportion, separating the individual application menu graphical objects 430.

In certain embodiments, one or more graphical objects, such as center point graphical object 410, category menu graphical objects 420, and/or application menu graphical objects 430, may be user selectable in graphical representation of two-dimensional radial menu 405. Accordingly, a user (e.g., a user of device 200) may select a particular graphical object displayed as part of two-dimensional radial menu 405 in GUI 400. A user selection may be detected in any suitable way through any suitable user interfaces, including touch screens, computer mice, image processing mechanisms, voice recognition mechanisms, buttons, joysticks, or any other user interface capable of detecting a user selection. For example, one or more graphical objects, such as center point graphical object 410, category menu graphical objects 420, and/or application menu graphical objects 430, may comprise one or more selectable touch objects displayed on a touch screen and that may be selected by a physical object (e.g., a finger or thumb) touching the selectable touch object(s). Accordingly, a user may conveniently select any of the graphical objects included in two-dimensional radial menu with a single touch.

FIG. 4B illustrates an exemplary graphical response 460 to a user selection of a graphical object in GUI 400. In one example, I/O facility 140 may detect a user selection of application menu graphical object 430-2 in GUI 400, and radial menu facility 150 may instruct one or more components of system 100 to display graphical response 460 indicating the detected user selection of application menu graphical object 430-2 in GUI 400. Graphical response 460 may include any visual indication of a user selection of application menu graphical object 430-2 in GUI 400. For example, application menu graphical object 430-2 may be enlarged in GUI 400. Graphical responses to user selections may include, without limitation, any graphical changes, movements, animation, events, modifications, or any other visual indications of user selections displayed in a GUI 400.

A user selection of a graphical object in two-dimensional radial menu 405 may be detected in any suitable way, and one or more predetermined actions may be performed by system 100 in response to the user selection. In certain embodiments, an application may be launched and/or executed in response to a user selection of an application menu graphical object 430 in two-dimensional radial menu 405. In response to a user selection of application menu graphical object 430-2, which may represent a voice communication application, for example, system 100 may execute the voice communication application.

In certain embodiments, a user selection of a graphical object in two-dimensional radial menu 405 may cause system 100 to display another view in GUI 400. For example, system 100 may display a category menu view in GUI 400 in response to a user selection of a category menu graphical object 420. As an example, a user may select category menu graphical object 420-2 in GUI 400. In response, system 100 may display a category menu view of category menu graphical object 420-2 in GUI 400.

FIG. 5 illustrates GUI 400 with an exemplary category menu view 500 displayed therein. As shown in FIG. 5, category menu view 500 may include overview information 510 associated with a category, one or more selectable options 520 associated with the category, and one or more application icons 530 (e.g., application icons 530-1 through 530-4) associated with one or more applications within the category. Hence, category menu view 500 may provide a dashboard view of information and options associated with a category. In the illustrated example, category menu view 500 is associated with a communications category and includes overview information 510 associated with communications (e.g., communications statistics) and application icons 530 associated with communication applications. A user selection of an application icon 530 may cause system 100 to launch the corresponding application.

In certain examples, category menu view 500 in FIG. 5 may correspond to a selected category menu graphical object 420-2 in FIG. 4A, and application icons 530-1 through 530-4 in FIG. 5 may correspond to application menu graphical objects 430-1 through 430-4 in FIG. 4A. That is, category menu view 500 in FIG. 5 and category menu graphical object 420-2 in FIG. 4A may represent the same communications category, and application menu graphical objects 430-1 through 430-4 in FIG. 4A and application icons 530-1 through 530-4 in FIG. 5 may represent the same communication applications (e.g., the same email, voice communication, text messaging, and other applications, respectively).

Figure 6:
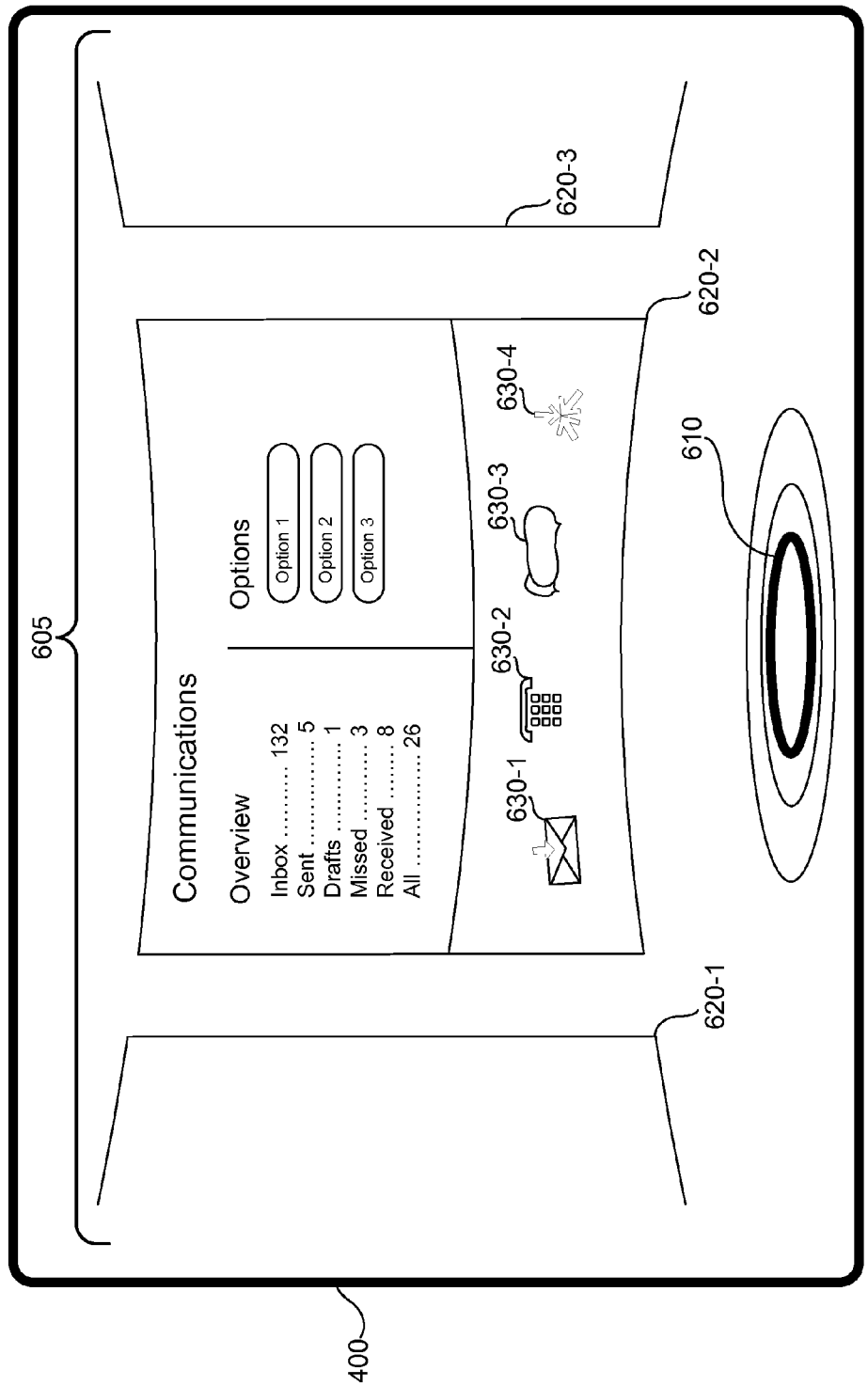
FIG. 6 illustrates a graphical representation of an exemplary three-dimensional radial menu in a GUI.

Another exemplary graphical representation of a radial menu will now be described. FIG. 6 illustrates GUI 400 with a graphical representation of an exemplary three-dimensional radial menu 605 displayed therein. Graphical representation of three-dimensional radial menu 605 may include a plurality of graphical objects arranged in a three-dimensional radial configuration view within GUI 400. As shown in the illustrated example, graphical representation of three-dimensional radial menu 605 may include a center point graphical object 610 and a plurality of category menu graphical objects 620 (e.g., category menu graphical objects 620-1 through 620-3) arranged radially about center point graphical object 610. The arrangement may form a three-dimensional radial layer of category menu graphical objects 620 at least partially or substantially encircling center point graphical object 610 at a certain radial distance from center point graphical object 610. The radial layer of category menu graphical objects 620 may contain certain divisions, of any size or proportion, separating the individual category menu graphical objects 620 as shown in FIG. 6. The example shown in FIG. 6 is illustrative only. Other radial configurations (e.g., a three-dimensional arc or spiral) may be used in other embodiments.

Center point graphical object 610 may indicate generally a radial center point of graphical representation of three-dimensional radial menu 605. Center point graphical object 610 may comprise any suitable visual indicator (e.g., an oval or ellipse) and/or attribute configured to visually represent the radial center point of the graphical representation of three-dimensional radial menu 405 and/or to distinguish center point graphical object 610 from one or more other graphical objects displayed in GUI 400.

Category menu graphical objects 620 may represent categories of applications, including any of the categories of application mentioned above. As described above, each category may include a menu category associated with one or more applications that share at least one common attribute. Categories may be defined and organized in any suitable way and may be associated with groups of one or more applications based on any attribute(s) common to one or more applications. In the example illustrated in FIG. 6, category menu graphical object 620-2 in GUI 400 represents a communications category associated with one or more communications applications, such as voice communication applications, email applications, and/or text messaging applications.

Category menu graphical objects 620 may comprise any suitable visual indicator and/or attribute configured to visually represent one or more categories of applications and/or to distinguish category menu graphical objects 620 from one another and/or from one or more other graphical objects displayed in GUI 400. As shown in FIG. 6, for example, category menu graphical objects 620 may comprise graphical representations of three-dimensional category menu views, such as category menu view 500 of FIG. 5, arranged in a radial configuration about center point graphical object 610.

As shown in FIG. 6, category menu graphical object 620-2 may represent a communications menu category and may be associated with a plurality of communication applications, which may be represented by communication application icons 630 (e.g., icons 630-1 through 630-4) included with category menu graphical object 620-2. In other embodiments, relationships between applications and category menu graphical objects 620 may be represented in other ways. For example, rather than being positioned within category menu graphical objects 620, application menu graphical objects may be radially aligned to form an outer layer about center point graphical object 610 at a second radial distance from center point graphical object 610 and at least partially or substantially encircling the radial layer of category menu graphical objects 620. In such embodiments, category menu graphical objects 620 may be transparent or semi-transparent such that application menu graphical objects may be visible through category menu graphical objects 620.

Graphical representation of three-dimensional radial menu 605 may visually represent a hierarchical menu organization of applications and menu categories associated with computing system 100. In particular, graphical representation of three-dimensional radial menu 605 may visually represent relationships between applications and menu categories in GUI 400. For instance, application menu graphical objects and/or application icons 630 may be positioned relative to certain category menu graphical objects 620 to visually indicate one or more hierarchical relationships. As an example, a position of application icons 630 relative to a position of category menu graphical object 620-2 (e.g., within or overlaid on category menu graphical object 620-2) may represent that the applications represented by application icons 630 are hierarchically related to a menu category represented by category menu graphical object 420-2.

In certain embodiments, one or more graphical objects, such as center point graphical object 610, category menu graphical objects 620, and/or application icons 630, may be user selectable in graphical representation of three-dimensional radial menu 605. Accordingly, a user (e.g., a user of device 200) may select a particular graphical object displayed as part of three-dimensional radial menu 605 in GUI 400. A user selection may be detected in any suitable way through any suitable user interfaces, including any of the ways and/or interfaces mentioned above. For example, one or more graphical objects, such as center point graphical object 610, category menu graphical objects 620, and/or application icons 630, may comprise one or more selectable touch objects displayed on a touch screen and that may be selected by a physical object (e.g., a finger or thumb) touching the selectable touch object(s). Accordingly, a user may conveniently select any of the graphical objects included in two-dimensional radial menu with a single touch.

A user selection of a graphical object in three-dimensional radial menu 605 may be detected in any suitable way, and one or more predetermined actions may be performed by system 100 in response to the user selection. In certain embodiments, an application may be launched and/or executed in response to a user selection of an application icon 630 in three-dimensional radial menu 605. In response to a user selection of application icon 630-2, which may represent a voice communication application, for example, system 100 may execute the voice communication application.

In certain embodiments, a user selection of a graphical object in three-dimensional radial menu 605 may cause system 100 to display another view in GUI 400. For example, system 100 may display a category menu view in GUI 400 in response to a user selection of a category menu graphical object 620. As an example, a user may select category menu graphical object 620-2 in GUI 400. In response, system 100 may display category menu view 500 shown in FIG. 5.

Graphical representation of three-dimensional radial menu 605 may provide a front-view display of at least one of the category menu graphical objects 620 in GUI 400. For example, as shown in FIG. 6, graphical representation of three-dimensional radial menu 605 may include a front-view display of category menu graphical object 620-2 with one or more other category menu graphical objects 620-1 and 620-3 positioned in the periphery of GUI 400 adjacent opposite side edges of category menu graphical object 620-2.

System 100 may be configured to pivot category menu graphical objects 620 around center point graphical object 610 in GUI 400. The pivoting may include moving category menu graphical objects 620 in and/or out of the front-view display shown of FIG. 6. For example, category menu graphical objects 620 may be pivoted to the left around center point graphical object 610 in GUI 400, which may cause category menu graphical object 620-2 to move out of the front-view display and category menu graphical object 620-3 to move into the front-view display.

In certain embodiments, system 100 may be configured to detect user input and pivot category menu graphical objects 620 around center point graphical object 610 in response to the detected user input. Any suitable user input may be defined and used to trigger the pivoting. For example, system 100 may be configured to pivot category menu graphical objects 620 around center point graphical object 610 in response to a finger swipe on a touch screen display (e.g., a sideways finger swipe indicative of a pivot direction), a physical object touching a predetermined area and/or graphical object displayed on a touch screen display, or any other suitable input.

In certain embodiments, the graphical representation of three-dimensional radial menu 605 shown in FIG. 6 may be a partial view of three-dimensional radial menu 605. As shown in FIG. 6, for example, one or more category menu graphical objects 620, such as category menu graphical objects 620-1 and 620-3 may be partially displayed in GUI 400. Additionally or alternatively, certain graphical objects of three-dimensional radial menu 605 may not be displayed at all in GUI 400. For example, while category menu graphical objects 620-1 through 620-3 are displayed in GUI 400 in FIG. 6, one or more other category menu graphical objects associated with three-dimensional radial men 605 may be positioned outside of or otherwise omitted from GUI 400. Such other category menu graphical objects may be move in and out of GUI 400 when system 100 pivots category menu graphical objects 620 around center point graphical object 610 as described above.

One or more graphical objects of three-dimensional radial menu 605 may correspond to one or more graphical objects of two-dimensional radial menu 405. In certain embodiments, for example, three-dimensional radial menu 605 and two-dimensional radial menu 405 may share a common center point. Hence, center point graphical object 410 and center point graphical object 610 may represent a common center point or center point graphical object shared by three-dimensional radial menu 605 and two-dimensional radial menu 405. As described in detail further below, the common center point graphical object may be repositioned in GUI 400 as part of a transition between views of three-dimensional radial menu 605 and two-dimensional radial menu 405 in GUI 400.

As another example of corresponding graphical objects, category menu graphical objects 620 in three-dimensional radial menu 605 may correspond to category menu graphical objects 420 in two-dimensional radial menu 405. For example, category menu graphical objects 620 and category menu graphical objects 420 may represent the same set of menu categories. As described in detail further below, category menu graphical objects 420 and/or 620 may be repositioned in GUI 400 as part of a transition between views of two-dimensional radial menu 405 and three-dimensional radial menu 605 in GUI 400.

As yet another example of corresponding graphical objects, application menu icons 630 in three-dimensional radial menu 605 may correspond to application menu graphical objects 430 in two-dimensional radial menu 405. For example, application menu icons 630 and application menu graphical objects 430 may represent the same applications. As described in detail further below, application menu graphical objects 430 and/or application menu icons 630 may be repositioned and/or modified in GUI 400 as part of a transition between views of two-dimensional radial menu 405 and three-dimensional radial menu 605 in GUI 400. For example, application menu graphical objects 420 may merge into category menu graphical objects 620 as application menu icons 630.

As an example of corresponding graphical objects, category menu graphical object 420-2 in FIG. 4A and category menu graphical object 620-2 in FIG. 6 may represent the same communications menu category, and application menu graphical objects 430-1 through 430-4 in FIG. 4A and application menu icons 630-1 through 630-4 in FIG. 6 may represent the same communications applications.

In certain embodiments, system 100 may be configured to transition between graphical representations of two-dimensional radial menu 405 and three-dimensional radial menu 605 in GUI 400. For example, radial menu facility 150 may direct processing facility 120 of system 100 to transform graphical representation of two-dimensional radial menu 405 to graphical representation of three-dimensional radial menu 605 and/or to transform graphical representation of three-dimensional radial menu 605 to graphical representation of two-dimensional radial menu 405 in GUI 400.

In certain embodiments, system 100 may execute a transition between graphical representations of two-dimensional radial menu 405 three-dimensional radial menu 605 in GUI 400 in response to detected user input. For example, a user selection of center point graphical object 410 of two-dimensional radial menu 405 in GUI 400 may trigger a transformation from graphical representation of two-dimensional radial menu 405 shown in FIG. 4A to graphical representation of three-dimensional radial menu 605 shown in FIG. 6. Similarly, a user selection of center point graphical object 610 of three-dimensional radial menu 605 in GUI 400 may trigger a transformation from graphical representation of three-dimensional radial menu 605 shown in FIG. 6 to graphical representation of two-dimensional radial menu 405 shown in FIG. 4A.

Figure 7:
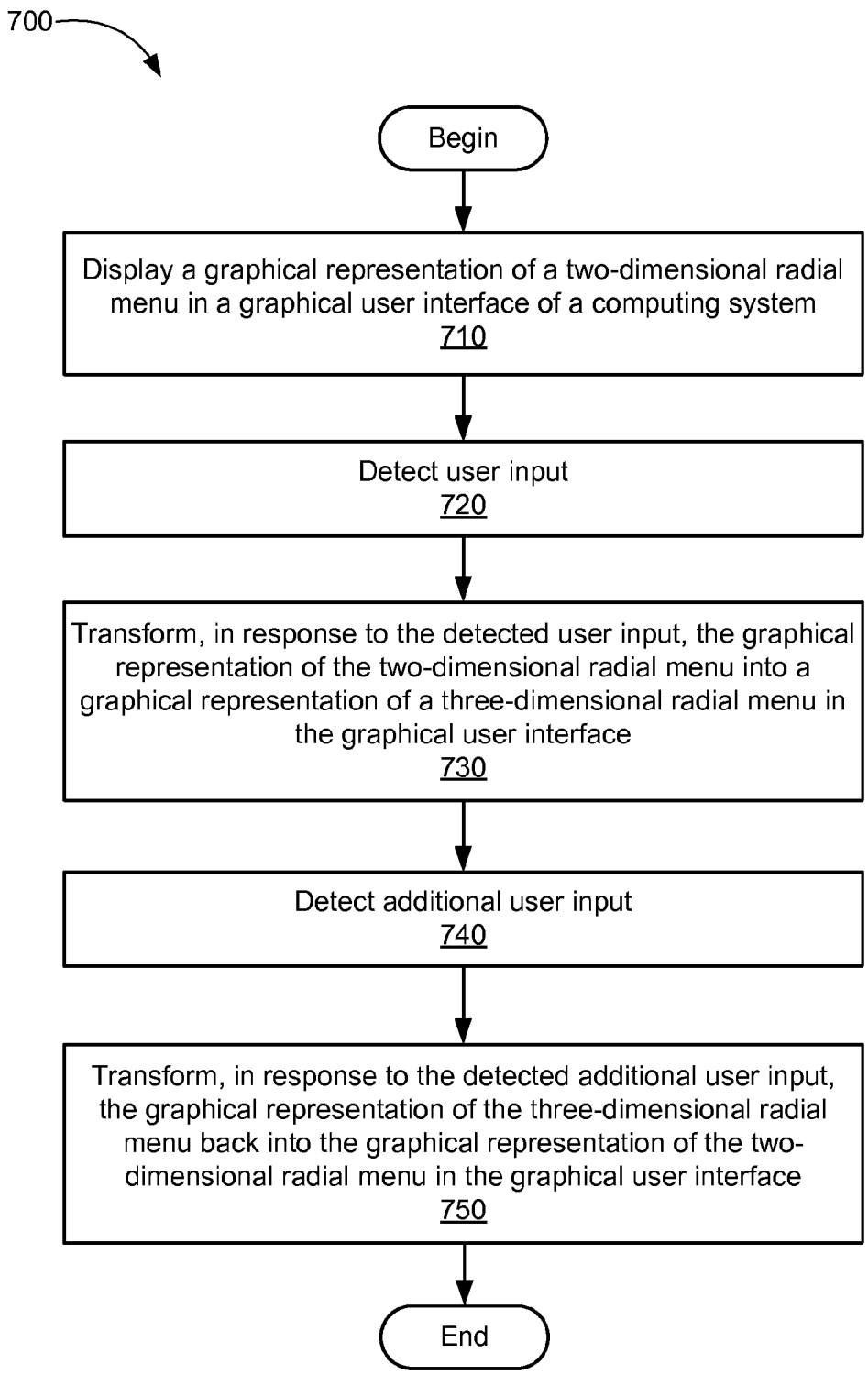
FIG. 7 illustrates an exemplary radial menu display method.

FIG. 7 illustrates an exemplary method 700 for radial menu display, which method 700 may include one or more transitions between graphical representations of two-dimensional and three-dimensional radial menus in GUI 400. While FIG. 7 illustrates exemplary steps according to one embodiment, other embodiments may omit, add to, reorder, and/or modify any of the steps shown in FIG. 7.

In step 710, a graphical representation of a two-dimensional radial menu may be displayed in a GUI of a computing system. For example, system 100 may display graphical representation of two-dimensional radial menu 405 in GUI 400, which may include radial menu facility 150 generating and/or providing data representative of two-dimensional radial menu 405 to user interface facility 160 for display in GUI 400 by I/O facility 140.

In step 720, user input may be detected. The user input may be associated with the graphical representation of two-dimensional radial menu 405 in GUI 400. System 100 (e.g., I/O facility 140 of system 100) may detect the user input, which may include any user input predefined to trigger a transition between graphical representations of radial menus. In certain embodiments, the user input may include a user selection of center point graphical object 410 included in graphical representation of two-dimensional radial menu 405.

In step 730, the graphical representation of the two-dimensional radial menu may be transformed, in response to the user input, into a graphical representation of a three-dimensional radial menu in the GUI. For example, system 100 may transform graphical representation of a two-dimensional radial menu 405 to graphical representation of three-dimensional radial menu 605 in GUI 400, which may include radial menu facility 150 providing data representative of the transformation to user interface facility 160 for display in GUI 400 by I/O facility 140.

In step 740, additional user input may be detected. The additional user input may be associated with the graphical representation of three-dimensional radial menu 605 in GUI 400. System 100 (e.g., I/O facility 140 of system 100) may detect the additional user input, which may include any user input predefined to trigger a transition between graphical representations of radial menus. In certain embodiments, the user input may include a user selection of center point graphical object 610 included in graphical representation of three-dimensional radial menu 605.

In step 750, the graphical representation of the three-dimensional radial menu may be transformed, in response to the additional user input, back into the graphical representation of the three-dimensional radial menu in the GUI. For example, system 100 may transform graphical representation of a three-dimensional radial menu 605 back into graphical representation of two-dimensional radial menu 405 in GUI 400, which may include radial menu facility 150 providing data representative of the transformation to user interface facility 160 for display in GUI 400 by I/O facility 140.

A transformation from one graphical representation of a radial menu to another graphical representation of a radial menu may be performed by system 100 in any suitable way. In certain embodiments, system 100 may replace a displayed graphical representation of a radial menu with another graphical representation of a radial menu in GUI 400. In certain other embodiments, the transformation may be performed in other ways, which may include, without limitation, repositioning graphical objects, rotating graphical objects, re-orienting graphical objects, changing viewpoints relative to graphical objects, zooming in on or out from graphical objects in GUI 400, adding a third dimension (e.g., a depth dimension along a z-axis) to one or more graphical objects, or any combination or sub-combination thereof.

In certain embodiments, for example, a transformation from graphical representation of two-dimensional radial menu 405 to graphical representation of a three-dimensional radial menu 605 in GUI 400 may include repositioning a common center point graphical object in GUI 400. For instance, center point graphical object 410 of FIG. 4A may be repositioned in GUI 400 to become center point graphical object 610 in FIG. 6. In addition, at least one category menu graphical object 420 of FIG. 4A may be repositioned in GUI 400 to become at least one corresponding category menu graphical object 620 in FIG. 6. In certain embodiments, a transformation from graphical representation of two-dimensional radial menu 405 to graphical representation of a three-dimensional radial menu 605 in GUI 400 may also include zooming in on graphical representation of three-dimensional radial menu 605, or zooming in on at least one or more graphical objects of graphical representation of three-dimensional radial menu 605, displayed in GUI 400.

In certain embodiments, a transformation from graphical representation of two-dimensional radial menu 405 to graphical representation of three-dimensional radial menu 605 in GUI 400 may include repositioning a viewpoint associated with graphical representation of two-dimensional radial menu 405 shown in FIG. 4A to produce graphical representation of three-dimensional radial menu 605 shown in FIG. 6. The repositioning of the viewpoint may include system 100 moving a viewpoint from a top-down viewpoint of graphical representation of two-dimensional radial menu 405 shown in FIG. 4A to a substantially ground-level viewpoint of graphical representation of three-dimensional radial menu 605 shown in FIG. 6. The substantially ground-level viewpoint of graphical representation of three-dimensional radial menu 605 may be positioned proximate to center point graphical object 610 of graphical representation of three-dimensional radial menu 605 in GUI 400, as represented in FIG. 6.

Such a transformation from graphical representation of two-dimensional radial menu 405 to graphical representation of three-dimensional radial menu 605 in GUI 400, as may be represented by FIG. 4A and FIG. 6, may be configured to provide a user experience in which, from a perspective of a user, a user vantage point is moving from a top-down, relatively distant view of two-dimensional radial menu 405 to a ground-level, relatively proximate view of three-dimensional radial menu 605. This may be configured to facilitate a centric user experience that places a user perspective near the center point of three-dimensional radial menu 605. In some examples, a transformation from graphical representation of two-dimensional radial menu 405 to graphical representation of three-dimensional radial menu 605 in GUI 400 may maintain consistent navigational principles and/or inputs between the two-dimensional radial menu 405 and the three-dimensional radial menu 605, with the three-dimensional radial menu 605 providing a more immersive user experience than is provided by the two-dimensional radial menu 405. In certain embodiments, system 100 may display one or more animation effects configured to represent a transformation from one graphical representation of a radial menu to another graphical representation of the radial menu.

Graphical representations of radial menus, including graphical representations of two-dimensional radial menu 405 and three-dimensional radial menu 605, may be rendered by system 100 in GUI 400 in any suitable manner. In one example, radial menu facility 150 may utilize data representative of a two-dimensional radial menu model to render a graphical representation of two-dimensional radial menu 405. Alternatively, radial menu facility 150 may utilize data representative of a three-dimensional radial menu model to render a graphical representation of two-dimensional radial menu 405. In certain examples, radial menu facility 150 may utilize data representative of a single radial menu model to render graphical representations of two-dimensional radial menu 405 and graphical representation of three-dimensional radial menu 605.

Figure 8:
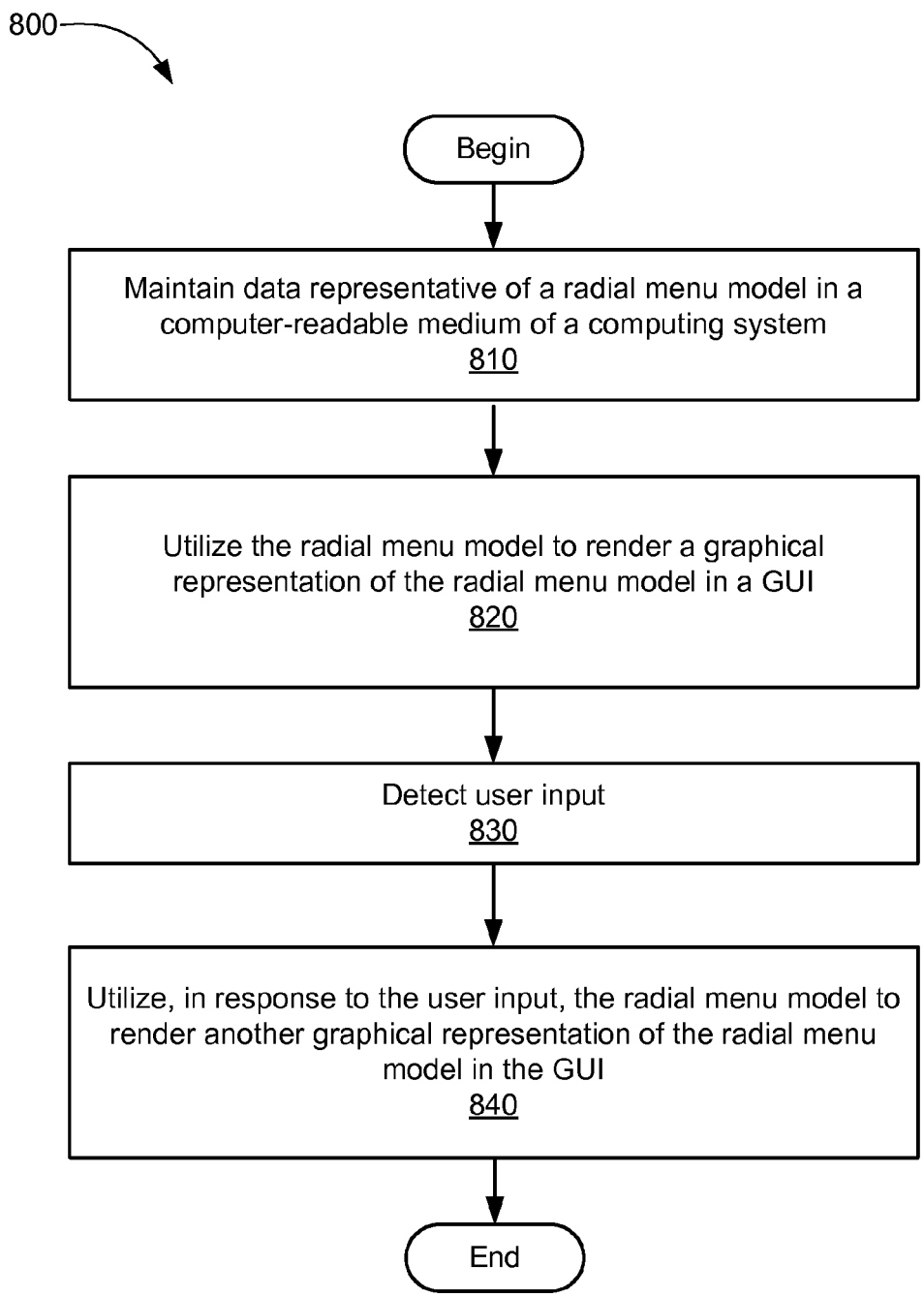
FIG. 8 illustrates another exemplary radial menu display method.

FIG. 8 illustrates another exemplary method 800 for radial menu display. While FIG. 8 illustrates exemplary steps according to one embodiment, other embodiments may omit, add to, reorder, and/or modify any of the steps shown in FIG. 8.

In step 810, data representative of a radial menu model may be maintained in a computer-readable medium of a computing system. For example, radial menu facility 150 may maintain data representative of a radial menu model in storage facility 130 of system 100. The data may be maintained in any format suitable for representing a radial menu model that may be used to render one or more graphical representations of radial menus in a GUI.

In step 820, the radial menu model may be utilized to render a graphical representation of the radial menu model in a GUI. For example, radial menu facility 150 may utilize data representative of the radial menu model to render graphical representation of two-dimensional radial menu 405 for display in GUI 400.

In step 830, user input may be detected. For example, I/O facility 140 may detect user input, which may include any suitable form of user input, including any forms of user input mentioned above.

In step 840, the radial menu model may utilized, in response to the user input, to render another graphical representation of the radial menu model in the GUI. For example, radial menu facility 150 may utilize data representative of the radial menu model to render graphical representation of three-dimensional radial menu 405 for display in GUI 400. Hence, data representative of radial menu model may be utilized to generate various graphical representations of the radial menu model in GUI 400.

Figure 9:
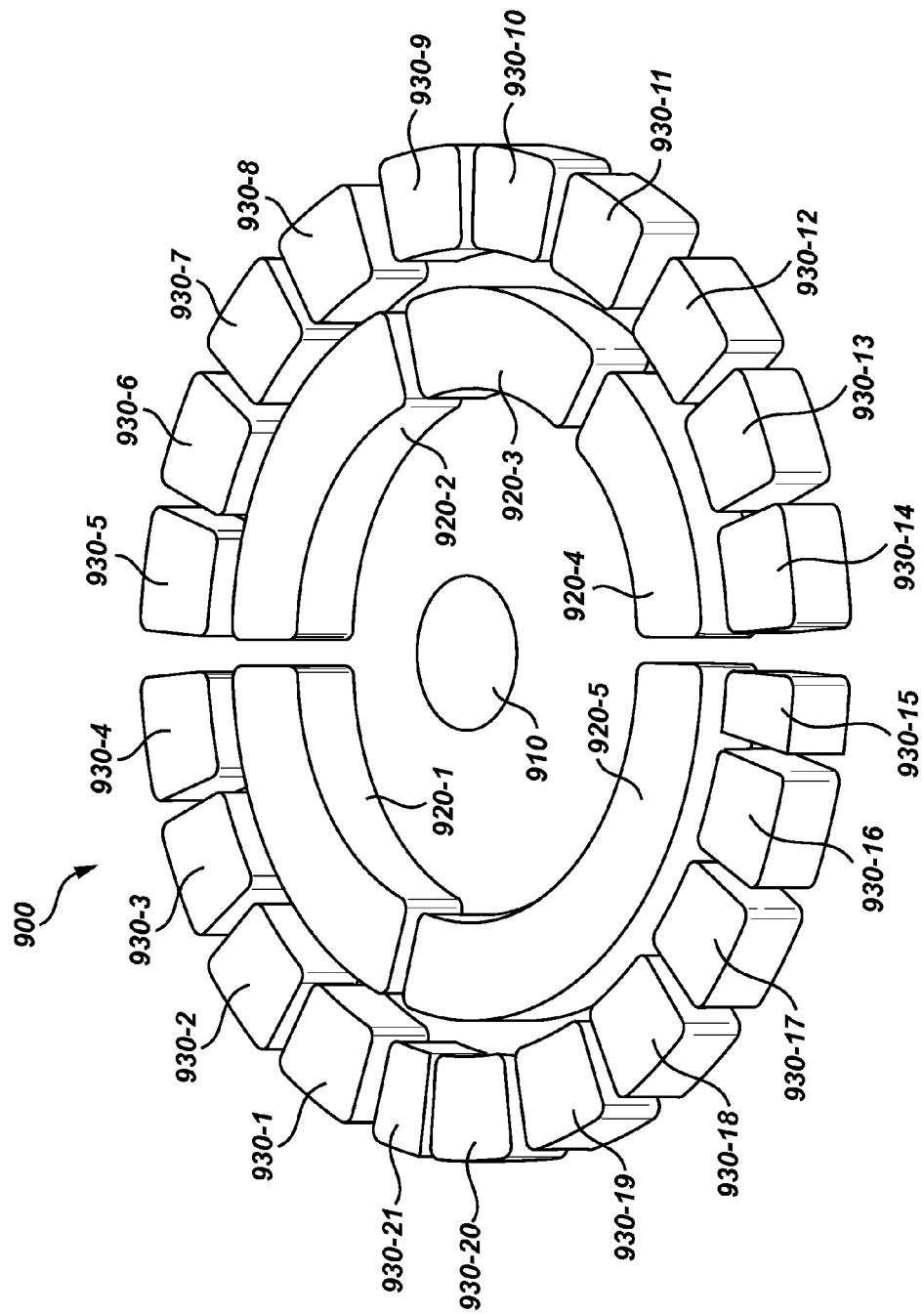
FIG. 9 illustrates a perspective view of an exemplary three-dimensional radial menu model.

FIG. 9 illustrates a perspective view of an exemplary three-dimensional radial menu model 900, which may be utilized in method 700 and/or 800 to render one or more graphical representations of a radial menu in GUI 400, as described above. As shown in FIG. 9, radial menu model 900 may include a radial configuration of three-dimensional objects, which may include a center point object 910, category menu objects 920 (e.g., category menu objects 920-1 through 920-5), and application menu objects 930 (e.g., application menu objects 930-1 through 930-21).

Center point graphical object 910 may generally indicate a radial center point of radial menu model 900. Category menu objects 920 may represent categories of applications, including any of the menu categories described above. Application menu objects 930 may represent one or more applications, which may include any software and/or device applications provided by (e.g., executable by) computing system 100 and/or accessible to a user of computing system 100.

Radial menu model 900 may represent a hierarchical menu organization of applications and menu categories associated with computing system 100. In particular, radial menu model 900 may represent relationships between applications and menu categories. Such relationships may be represented by relative positioning of objects in radial menu model 900. For instance, application menu objects 930 may be positioned relative to certain category menu objects 920 to visually indicate one or more hierarchical relationships. In FIG. 9, for example, application menu objects 930-1 through 930-4 are positioned adjacent to category menu object 920-1 to indicate relationships between the application represented by application menu objects 930-1 through 930-4 and the menu category represented by category menu object 920-1.

As illustrated in FIG. 9, category menu objects 920 may be radially aligned to form an inner radial layer of category menu objects 920 positioned about center point object 910 at a first radial distance from center point object 910. In certain embodiments, the inner radial layer of category menu objects 920 may substantially encircle center point object 910. In addition, application menu objects 930 may be radially aligned to form an outer radial layer of application menu objects 930 positioned about center point object 910 at a second radial distance from center point object 910. In certain embodiments, the outer radial layer of application menu objects 930 may substantially encircle the inner radial layer of category menu objects 920.

One or more objects included in radial menu model 900 may be utilized by system 100 to generate a graphical representation of at least a portion of radial menu model 900 in GUI 400. For example, system 100 may utilize one or more objects of radial menu model 900, or another similarly configured radial menu model, to generate the graphical representation of two-dimensional radial menu 405 shown in FIG. 4A and/or the graphical representation of three-dimensional radial menu 605 shown in FIG. 6.

In certain embodiments, system 100 may be configured to move a viewpoint relative to radial menu model 900 to generate various views of radial menu model 900 in GUI 400. For example, system 100 may use a first viewpoint positioned directly above and a certain distance away from radial menu model 900 to generate the graphical representation of two-dimensional radial menu 405 shown in FIG. 4A. System 100 may reposition the first viewpoint relative to radial menu model 900 to generate another view of radial menu model 900. For example, the viewpoint may be moved from a first position directly above radial menu model 900 to a second position that provides an angled, zoomed-in perspective view of radial menu model 900. Such movements of the viewpoint may be used to transform the graphical representation of two-dimensional radial menu 405 shown in FIG. 4A to the graphical representation of three-dimensional radial menu 605 shown in FIG. 6. In certain embodiments, movement of a viewpoint relative to radial menu model 900 may be animated in real time in GUI 400, which may cause radial menu model 900 to appear to be tilted, re-oriented, enlarged, minimized, or otherwise manipulated in GUI 400. In this or similar manner, various viewpoints of radial menu model 900 may be used by system 100 to display various graphical representations of radial menu model 900 in GUI 400.

The radial menu model 900 and graphical representations of radial menus described above are illustrative only. Other radial menu configurations may be used in other embodiments. For example, in certain embodiments, a radial menu may additionally include one or more sub-categories, which may further classify and/or hierarchically organize applications based on one or more common attributes. A sub-category may group applications based on one or more common attributes that are more specific than common attributes of a category. For example, within a communications category represented by a category menu graphical object, a sub-category menu graphical object may represent a sub-category of voice communication applications while another sub-category menu graphical object may represent a sub-category of Internet communication applications. A sub-category may be represented by a sub-category menu graphical object.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying, by a computing system, a graphical representation of a two-dimensional radial menu in a graphical user interface generated by said computing system;
    detecting, by said computing system, user input associated with said graphical representation of said two-dimensional radial menu in said graphical user interface; and
    transforming, by said computing system, said graphical representation of said two-dimensional radial menu into a graphical representation of a three-dimensional radial menu in said graphical user interface in response to said user input;
    wherein said graphical representation of said two-dimensional radial menu comprises:
        a center point graphical object;
        a plurality of category menu graphical objects positioned about said center point graphical object at a first radial distance from said center point graphical object; and
        a plurality of application menu graphical objects positioned about said plurality of category menu graphical objects at a second radial distance from said center point graphical object;
    wherein said graphical representation of said three-dimensional radial menu provides a front-view display of at least one of said category menu graphical objects in said graphical user interface, said front-view display being from a viewpoint proximate to a center of said three-dimensional radial menu.

2. The method of claim 1, further comprising:
    detecting additional user input with said computing system; and
    pivoting, by said computing system, said plurality of said category menu graphical objects around said center of said three-dimensional radial menu in response to said additional user input.

3. The method of claim 2, wherein said pivoting comprises moving at least one of said category menu graphical objects out of said front-view display in said graphical user interface and moving at least one other of said category menu graphical objects into said front-view display in said graphical user interface.

4. The method of claim 1, wherein said user input comprises a user selection of said center point graphical object included in said graphical representation of said two-dimensional radial menu.

5. The method of claim 1, wherein:
    said graphical representation of said two-dimensional radial menu and said graphical representation of said three-dimensional radial menu comprise a common center point; and
    said transforming comprises repositioning said common center point in said graphical user interface.

6. The method of claim 1, wherein said transforming comprises repositioning at least one of said category menu graphical objects in said graphical user interface.

7. The method of claim 1, wherein said transforming comprises zooming in on said graphical representation of said three-dimensional radial menu in said graphical user interface.

8. The method of claim 1, wherein:
    said category menu graphical objects form an inner radial layer substantially encircling said center point graphical object; and
    said application menu graphical objects form an outer radial layer substantially encircling said inner radial layer.

9. The method of claim 1, tangibly embodied as computer-executable instructions on at least one computer-readable medium, the computer-executable instructions configured to direct at least one processor of said computing system to perform at least one of said displaying and said transforming.

10. A system comprising:
at least one processor; and
a radial menu facility in communication with said at least one processor and configured to direct said at least one processor to
display a graphical representation of a two-dimensional radial menu in a graphical user interface,
detect user input associated with said graphical representation of said two-dimensional radial menu in said graphical user interface, and
transform said graphical representation of said two-dimensional radial menu into a graphical representation of a three-dimensional radial menu in said graphical user interface in response to said user input;
wherein said graphical representation of said two-dimensional radial menu comprises:
a center point graphical object;
a plurality of category menu graphical objects positioned about said center point graphical object at a first radial distance from said center point graphical object; and
a plurality of application menu graphical objects positioned about said plurality of category menu graphical objects at a second radial distance from said center point graphical object;
wherein said graphical representation of said three-dimensional radial menu provides a front-view display of at least one of said category menu graphical objects in said graphical user interface, said front-view display presented from a viewpoint proximate to a center of said three-dimensional radial menu.

11. A method comprising:
displaying, by a computing system, a graphical representation of a two-dimensional radial menu in a graphical user interface generated by said computing system;
detecting, by said computing system, user input associated with said graphical representation of said two-dimensional radial menu in said graphical user interface, wherein said user input comprises a user selection of a center point graphical object included in said graphical representation of said two-dimensional radial menu;
transforming, by said computing system, said graphical representation of said two-dimensional radial menu into a graphical representation of a three-dimensional radial menu in said graphical user interface in response to said user input;
detecting, by said computing system, a user selection of said center point graphical object included in said graphical representation of said three-dimensional radial menu; and
transforming, by said computing system, said graphical representation of said three-dimensional radial menu back into said graphical representation of said two-dimensional radial menu in said graphical user interface in response to said user selection of said center point graphical object included in said graphical representation of said three-dimensional radial menu.

12. The method of claim 11, wherein:
said graphical representation of said two-dimensional radial menu and said graphical representation of said three-dimensional radial menu comprise a common center point; and
said transforming of said graphical representation of said two-dimensional radial menu into said graphical representation of said three-dimensional radial menu comprises repositioning said center point in said graphical user interface.

13. The method of claim 11, wherein:
said graphical representation of said two-dimensional radial menu comprises at least one category menu graphical object; and
said transforming of said graphical representation of said two-dimensional radial menu into said graphical representation of said three-dimensional radial menu comprises repositioning said at least one category menu graphical object in said graphical user interface.

14. The method of claim 11, wherein said transforming of said graphical representation of said two-dimensional radial menu into said graphical representation of said three-dimensional radial menu comprises repositioning a viewpoint associated with said graphical representation of said two-dimensional radial menu to produce said graphical representation of said three-dimensional radial menu in said graphical user interface.

15. The method of claim 14, wherein said repositioning of said viewpoint comprises moving said viewpoint from a top-down viewpoint of said two-dimensional radial menu to a substantially ground-level viewpoint of said three-dimensional radial menu in said graphical user interface.

16. The method of claim 15, wherein said substantially ground-level viewpoint is positioned proximate to a center point of said graphical representation of said three-dimensional radial menu in said graphical user interface.

17. The method of claim 14, wherein said transforming further comprises zooming in on said graphical representation of said three-dimensional radial menu in said graphical user interface.

18. The method of claim 11, wherein said graphical representation of said two-dimensional radial menu comprises:
a plurality of category menu graphical objects positioned about said center point graphical object at a first radial distance from said center point graphical object; and
a plurality of application menu graphical objects positioned about said plurality of category menu graphical objects at a second radial distance from said center point graphical object.

19. The method of claim 18, wherein:
said category menu graphical objects form an inner radial layer substantially encircling said center point graphical object; and
said application menu graphical objects form an outer radial layer substantially encircling said inner radial layer.

20. The method of claim 11, wherein:
said displaying comprises utilizing data representative of a three-dimensional radial menu model to render said graphical representation of said two-dimensional radial menu, based on a first viewpoint, in said graphical user interface of said computing system; and
said transforming of said graphical representation of said two-dimensional radial menu into said graphical representation of said three-dimensional radial menu comprises utilizing said data representative of said three-dimensional radial menu model to render said graphical representation of said three-dimensional radial menu, based on a second viewpoint, in said graphical user interface.

21. The method of claim 11, tangibly embodied as computer-executable instructions on at least one computer-readable medium, the computer-executable instructions configured to direct at least one processor of said computing system to perform at least one of said displaying and said transforming of said graphical representation of said two-dimensional radial menu into said graphical representation of said three-dimensional radial menu.

22. A system comprising:

at least one processor; and a radial menu facility in communication with said at least one processor and configured to direct said at least one processor to display a graphical representation of a two-dimensional radial menu in a graphical user interface, detect user input associated with said graphical representation of said two-dimensional radial menu in said graphical user interface, wherein said user input comprises a user selection of a center point graphical object included in said graphical representation of said two-dimensional radial menu, transform said graphical representation of said two-dimensional radial menu into a graphical representation of a three-dimensional radial menu in said graphical user interface in response to said user input;

detect a user selection of said center point graphical object included in said graphical representation of said three-dimensional radial menu, and transform said graphical representation of said three-dimensional radial menu back into said graphical representation of said two-dimensional radial menu in said graphical user interface in response to said user selection of said center point graphical object included in said graphical representation of said three-dimensional radial menu.

23. The system of claim 22, further comprising:

a storage facility in communication with said at least one processor;

wherein said radial menu facility is further configured to direct said at least one processor to maintain data representative of a radial menu model in said storage facility, and utilize said radial menu model to render at least one of said two-dimensional radial menu and said three-dimensional radial menu for display in said graphical user interface.

\* \* \* \* \*